United States Patent Office 3,474,116
Patented Oct. 21, 1969

3,474,116
5,13-DIALKYLGON-3-ONE COMPOUNDS
George C. Buzby, Jr., Philadelphia, and Herchel Smith, Wayne, Pa., assignors to American Home Products Corporation, New York, N.Y., a corporation of Delaware
No Drawing. Filed Apr. 4, 1967, Ser. No. 628,270
Int. Cl. C07c *169/10, 167/14;* A61k *27/00*
U.S. Cl. 260—397.4     10 Claims

ABSTRACT OF THE DISCLOSURE

The compounds of the class of 5,13-dialkylgon-3-one compounds useful as anti-androgenic agents.

BACKGROUND OF THE INVENTION

This invention relates to the field of new physiologically active 5,13-dialkylgonan-3-one, 1,5,13-trialkylgonan-3-one and 2-halo-5,13-dialkylgonan-3-one compounds, novel process for their preparation and new intermediates useful in the preparation thereof.

SUMMARY OF THE INVENTION

More particularly, this invention is directed to compounds of the formulae:

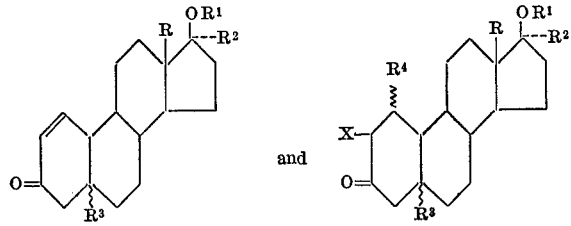

and wherein $\{$ represents the alpha or beta positions; R and $R^3$ are each alkyl groups of less than 5 carbon atoms; $R^1$ is selected from the group consisting of hydrogen and acyl; $R^2$ is selected from the group consisting of hydrogen and alkyl of less than 5 carbon atoms; $R^4$ is selected from the group consisting of hydrogen and alkyl of less than 5 carbon atoms; and X is selected from the group consisting of hydrogen and halo with the proviso that $R^4$ is alkyl when X is hydrogen.

The final products of this invention are physiologically active substances which are useful as anti-androgenic agents. Hence, they may be administered in lieu of known anti-androgenic agents such as A-norprogesterone.

The compounds may be formulated for such administration based on the activity of the particular compound and the requirements of the patient.

DESCRIPTION OF THE PREFERRED EMBODIMENTS

The compounds of this invention may be prepared according to the process of this invention which may be represented by the following reaction scheme wherein R, $R^1$, $R^2$ and $R^3$ are as hereinbefore defined, and $X^1$ is halo; and $R^5$ is alkyl:

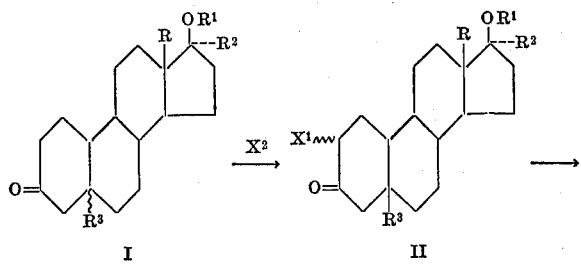

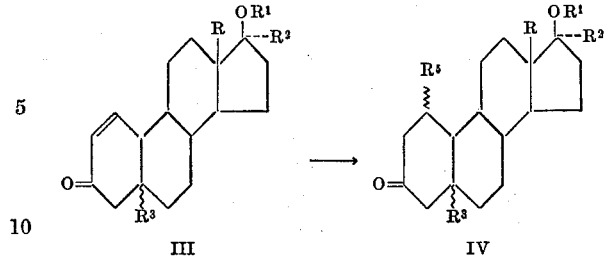

According to one feature of this invention, 5,13-dialkylgon-3-one compounds of the Formula I are treated with halogen, preferably, bromine or chlorine, in an inert organic solvent to yield the 2-halo-5,13-dialkylgon-3-one compounds of Formula II.

The initial 5,13-dialkylgon-3-one compounds (I) may be prepared in accordance with any prior art processes such as described by G. C. Buzby et al. in copending application Ser. No. 536,294, filed Mar. 22, 1966.

The 2-halo-5,13-dialkylgon-3-one compounds (II) are then refluxed with lithium salt, preferably, lithium carbonate and lithium chloride in an inert organic solvent, to yield the corresponding 5,13-dialkylgon-1-en-3-ones (III), which are some of the pharmacologically active final products of this invention.

In accordance with another feature of this invention, the 5,13-dialkylgon-1-en-3-ones are treated with an organo-metal compound, such as Grignard compound, to yield the 1,5,13-trialkylgon-3-one compounds of Formula IV, which are additional pharmacologically active final products of this invention.

Additionally, the 3,17-dione compounds of this invention may be prepared by treating the compounds of Formula IV, wherein $R^1$ and $R^2$ are hydrogen, with an oxidizing agent, such as Jones reagent.

The following examples illustrate the invention (all temperatures being in centigrade):

EXAMPLE 1

13β,17α-diethyl-2-bromo-17β-hydroxy-5-methylgonan-3-one

To 1.995 gm. of 13,17-diethyl-17β-hydroxy-5-methylgonan-3-one in 20 ml. of dimethylformamide containing 0.12 ml. of 48% hydrogen bromide is added 1.12 gm. of bromine in 20 ml. of dimethylformamide over 4 hours. The solution is then poured into 150 ml. of cold water and filtered to yield 2.25 gm. of 13β17α-diethyl-2-bromo-17β-hydroxy-5-methylgonan-3-one, M.P. 70–90°;

$\lambda_{max}^{KBr}$ 3.0, 5.80, 5.86μ

*Analysis.*—Calcd. for $C_{22}H_{35}O_2Br$ requires: Br, 18.0%. Found: Br, 16.9%.

EXAMPLE 2

13,17-diethyl-2-bromo-17β-hydroxy-5-methylgonan-3-one, 17-acetate

Following the procedure of Example 1, but substituting 13,17 - diethyl - 17β - hydroxy-5-methylgonan-3-one, 17-acetate for 13,17-diethyl-17β-hydroxy-5-methylgonan-3-one there is obtained 13,17 - diethyl - 2 - bromo-17β-hydroxy-5-methylgonan-3-one, 17-acetate.

EXAMPLE 3

13,17-diethyl-2-bromo-17β-hydroxy-5-ethylgonan-3-one

Following the procedure of Example 1, but substituting 13,17-diethyl-17β-hydroxy-5-ethylgonan-3-one for 13,17-diethyl - 17β - hydroxy-5-methylgonan-3-one, there is obtained 13,17 - diethyl-2-bromo-17β-hydroxy-5-ethylgonan-3-one.

EXAMPLE 4

13,17-diethyl-2-bromo-17β-hydroxy-5-propylgonan-3-one

Following the procedure of Example 1, but substituting 13,17 - diethyl - 17β - hydroxy-5-propylgonan-3-one for 13,17-diethyl-17β-hydroxy-5-methylgonan-3-one, there is obtained 13,17 - diethyl - 2 - bromo-17β-hydroxy-5-propylgonan-3-one.

EXAMPLE 5

13,17-diethyl-2-bromo-17β-hydroxy-5-butylgonan-3-one

Following the procedure of Example 1, but substituting 13,17-diethyl-17β-hydroxy-5-butylgonan-3-one for 13,17-diethyl-17β-hydroxy-5-methylgonan-3-one, there is obtained 13,17-diethyl-2-bromo-17β-hydroxy-5-butylgonan-3-one.

EXAMPLE 6

13-ethyl-17-methyl-2-bromo-17β-hydroxy-5-methylgonan-3-one

Following the procedure of Example 1, but substituting 13 - ethyl - 17-methyl-17β-hydroxy-5-methylgonan-3-one for 13,17-diethyl-17β-hydroxy-5-methylgonan-3-one there is obtained 13-ethyl-17-methyl-2-bromo-17β-hydroxy-5-methylgonan-3-one.

EXAMPLE 7

13-ethyl-17-propyl-2-bromo-17β-hydroxy-5-methylgonan-3-one

Following the procedure of Example 1, but substituting 13-ethyl-17-propyl-17β-hydroxy-5-methylgonan-3-one for 13,17-diethyl-17β-hydroxy-5-methylgonan-3-one there is obtained 13 - ethyl - 17-propyl-2-bromo-17β-hydroxy-5-methylgonan-3-one.

EXAMPLE 8

13-ethyl-17-butyl-2-bromo-17β-hydroxy-5-methylgonan-3-one

Following the procedure of Example 1, but substituting 13 - ethyl - 17 - butyl - 17β-hydroxy-5-methylgonan-3-one for 13,17 - diethyl - 17β - hydroxy-5-methylgonan-3-one, there is obtained 13 - ethyl - 17-butyl-2-bromo-17β-hydroxy-5-methylgonan-3-one.

EXAMPLE 9

13-propyl-17-methyl-2-bromo-17β-hydroxy-5-methylgonan-3-one

Following the procedure of Example 1, but substituting 13 - propyl-17-methyl-17β-hydroxy-5-methylgonan-3-one for 13,17 - diethyl - 17β-hydroxy-5-methylgonan-3-one, there is obtained 13-propyl-17-methyl-2-bromo-17β-hydroxy-5-methylgonan-3-one.

EXAMPLE 10

13-butyl-17-methyl-2-bromo-17β-hydroxy-5-methylgonan-3-one

Following the procedure of Example 1, but substituting 13 - butyl - 17-methyl-17β-hydroxy-5-methylgonan-3-one for 13,17-diethyl-17β-hydroxy-5-methylgonan-3-one there is obtained 13 - butyl-17-methyl-2-bromo-17β-hydroxy-5-methylgonan-3-one.

EXAMPLE 11

5-methyl-2-bromo-19-norandrostan-17-ol-3-one

Following the procedure of Example 1, but substituting 5-methyl-19-norandrostan-17-ol-3-one for 13,17-diethyl-17 - hydroxy - 5 - methylgonan-3-one there is obtained 5-methyl-2-bromo-19-norandrostan-17-ol-3-one.

EXAMPLE 12

13-ethyl-2-bromo-17β-hydroxy-5-methylgonan-3-one

Following the procedure of Example 1, but substituting 13 - ethyl - 17β-hydroxy-5-methylgonan-3-one for 13,17-diethyl - 17 - hydroxy-5-methylgonan-3-one, there is obtained 13 - ethyl-2-bromo-17β-hydroxy-5-methylgonan-3-one.

EXAMPLE 13

13,17-diethyl-17β-hydroxy-5-methylgon-1-en-3-one

A mixture of 2.25 gm. of 13,17-diethyl-2-bromo-17β-hydroxy-5-methylgonan-3-one, 0.71 gm. of lithium carbonate and 0.41 gm. of lithium chloride in 40 ml. of dimethylformamide is refluxed under nitrogen for 4 hours. The reaction mixture is then cooled, filtered, the cake washed with ether and the filtrate is poured into water. The ether layer is then separated, washed, dried and the solvent removed to yield 0.915 gm. of a solid.

The solid is chromatographed over neutral alumina to yield 0.720 gm. of 13,17-diethyl-17β-hydroxy-5-methylgon-1-en-3-one, M.P. 124–127°, $\lambda_{max.}^{KBr}$ 2.91, 5.99; $\lambda_{max.}^{EtOH}$ 237 mμ (ε 8,600)

*Analysis.*—Calcd. for $C_{22}H_{34}O_2$ requires: C, 79.95; H, 10.37. Found: C, 79.46; H, 10.20.

Treatment of the products of Examples 2 through 12 according to the procedure of Example 13 yields, respectively, the products of the following Examples 14 through 24:

| Example No. | Starting material is the product of Ex. No. | Products |
|---|---|---|
| 14 | 2 | 13,17-diethyl-17β-hydroxy-5-methylgon-1-en-3-one, 17 acetate. |
| 15 | 3 | 5,13,17-triethyl-17β-hydroxygon-1-en-3-one. |
| 16 | 4 | 13,17-diethyl-17β-hydroxy-5-propylgon-1-en-3-one. |
| 17 | 5 | 13,17-diethyl-17β-hydroxy-5-butylgon-1-en-3-one. |
| 18 | 6 | 13-ethyl-17-methyl-17β-hydroxy-5-methylgon-1-en-3-one. |
| 19 | 7 | 13-ethyl-17-propyl-17β-hydroxy-5-methylgon-1-en-3-one. |
| 20 | 8 | 13-ethyl-17-butyl-17β-hydroxy-5-methylgon-1-en-3-one. |
| 21 | 9 | 13-propyl-17-methyl-17β-hydroxy-5-methylgon-1-en-3-one. |
| 22 | 10 | 13-butyl-17-methyl-17β-hydroxy-5-methylgon-1-en-3-one. |
| 23 | 11 | 5-methyl-19-norandrost-1-en-17-ol-3-one. |
| 24 | 12 | 13-ethyl-17β-hydroxy-5-methylgon-1-en-3-one. |

EXAMPLE 25

13,17-diethyl-1ξ,5ξ-dimethyl-17β-hydroxygonan-3-one 0.703 gm. of 13,17-diethyl-17β-hydroxy-5-methylgon-1-en-3-one in 10 ml. of dry tetrahydrofuran is added dropwise to 40 ml. of dry tetrahydrofuran containing cuprous chloride (1.0 g.) and 20 ml. of methyl magnesium bromide 3 M in ether (20 ml.). The reaction is stirred an hour, poured into brine saturated with HCl and the ether layer washed, dried and evaporated in vacuo. The residue is recrystallized from ether to yield 0.380 g. of 13,17 - diethyl - 1,5 - dimethyl-17β-hydroxygonan-3-one, M.P. 154–156°;

$\lambda_{max.}^{KBr}$ 2.84, 5.85μ

*Analysis.*—Calcd. for $C_{23}H_{38}O_2$ requires: C, 79.71; H, 11.05. Found: C, 79.30; H, 11.00.

Similarly, by following the procedure of Example 25, but substituting another Grignard reagent for the methyl magnesium bromide, such as ethyl magnesium bromide, propyl magnesium bromide, butyl magnesium bromide, and the like, the corresponding 1-alkyl derivative is obtained.

EXAMPLE 26

13,17-diethyl-1,5-dimethyl-17β-hydroxygonan-3-one 17-acetate

Following the procedure of Example 25, but substituting 13,17-diethyl-17β-hydroxy-5-methylgon - 1 - en-3-one, 17-acetate for 13, 17-diethyl-17β-hydroxy-5-methylgon-1-en-3-one, there is obtained 13,17-diethyl-1,5-dimethyl-17β-hydroxygonan-3-one, 17-acetate.

EXAMPLE 27

5,13,17-triethyl-1-methyl-17β-hydroxyonan-3-one

Following the procedure of Example 25, but substituting 5,13,17-triethyl-17β-hydroxygon - 1 - en-3-one for 13,17-diethyl-17β-hydroxy-5-methylgon - 1 - en-3-one there is obtained 5,13,17-triethyl-1-methyl-17β-hydroxygonan-3-one.

EXAMPLE 28

13,17-diethyl-1-methyl-5-propyl-17β-hydroxygonan-3-one

Following the procedure of Example 25, but substituting 13,17-diethyl-17β-hydroxy-5-propylgon-1-en-3-one for 13,17-diethyl-17β-hydroxy-5-propylgon-1-en-3-one there is obtained 13,17diethyl-1-methyl-5-propyl-17β-hydroxygonan-3-one.

EXAMPLE 29

13,17-diethyl-1-methyl-5-butyl-17β-hydroxygonan-3-one

Following the procedure of Example 25, but substituting 13,17-diethyl-17β-hydroxy-5-butylgon-1-en-3-one for 13,17-diethyl-17β-hydroxy-5-propylgon-1-en-3-one there is obtained 13,17-diethyl - 1 - methyl-5-butyl-17β-hydroxygonan-3-one.

EXAMPLE 30

13-ethyl-17-methyl-1,5-dimethyl-17β-hydroxygonan-3-one

Following the procedure of Example 25, but substituting 13-ethyl-17-methyl-17β-hydroxy-5-methylgon-1-en-3-one for 13,17-diethyl-17β-hydroxy-5-methylgon-1-en-3-one there is obtained 13-ethyl-17-propyl-1,5-dimethyl-17β-hydroxygonan-3-one.

EXAMPLE 31

13-ethyl-17-propyl-1,5-dimethyl-17β-hydroxygonan-3-one

Following the procedure of Example 25, but substituting 13 - ethyl-17-propyl-17β-hydroxy-5-methylgon-1-en-3-one for 13,17-diethyl-17β-hydroxy - 5 - methylgon-1-en-3-one there is obtained 13-ethyl-17-propyl-1,5-dimethyl-17β-hydroxygonan-3-one.

EXAMPLE 32

13-ethyl-17-butyl-1,5-dimethyl-17β-hydroxygonan-3-3-one

Following the procedure of Example 25, but substituting 13-ethyl-17-butyl-17β-hydroxy-5-methylgon-1-en-3-one for 13,17 - diethyl-17β-hydroxy-5-methylgon-1-en-3-one, there is obtained 13-ethyl-17-butyl-1,5-dimethyl-17β-hydroxygonan-3-one.

EXAMPLE 33

13-propyl-17-methyl-1,5-dimethyl-17β-hydroxygonan-3-one

Following the procedure of Example 25, but substituting 13-propyl-17-methyl-17β-hydroxy-5-methylgon-1-en-3-one for 13,17-diethyl-17β-hydroxy-5-methylgon-1-en-3-one there is obtained 13-propyl-17-methyl-1,5-dimethyl-17β-hydroxygonan-3-one.

EXAMPLE 34

13-butyl-17-methyl-1,5-dimethyl-17β-hydroxygonan-3-one

Following the procedure of Example 25, but substituting 13-butyl-17-methyl-17β-hydroxy-5-methylgon-1-en-3-one for 13,17-diethyl-17β-hydroxy-5-methylgon-1-en-3-one, there is obtained 13-butyl-17-methyl-1,5-dimethyl-17β-hydroxygonan-3-one.

EXAMPLE 35

1,5-dimethyl-19-norandrostan-17-ol-3-one

Following the procedure of Example 25, but substituting 5-methyl - 19 - norandrost-1-en-17-ol-3-one for 13,17-diethyl-17β-hydroxy-5-methylgon-1-en-3-one there is obtained 1,5-dimethyl-19-norandrostan-17-ol-3-one.

EXAMPLE 36

13-ethyl-1,5-dimethylgonane-3,17-dione (A) Following the procedure of Example 25, but substituting 13-ethyl-17β-hydroxy-5-methylgon-1-en-3-one for 13,17-diethyl-17β-hydroxy-5-methylgon-1-en-3-one there is obtained 13-ethyl-1,5-dimethyl-17β-hydroxygonan-3-one.

(B) Treatment of the 13-ethyl-1,5-dimethyl-17β-hydroxygon-3-one with Jones reagent yields 13-ethyl-1,5-dimethylgonane-3,17-dione.

It is understood that either the dl-steroids or the specific d- or l-isomers may be employed as starting materials with like results.

It is further understood that the 1α- or 1β-alkyl and 5α- or 5β-alkyl steroids are included within the scope of the invention.

What is claimed is:

1. A compound selected from those of the formulae

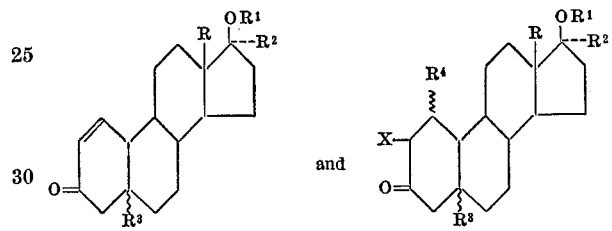

wherein R and R³ are each alkyl groups of less than 5 carbon atoms; R¹ is selected from the group consisting of hydrogen and lower acyl; R² is selected from the group consisting of hydrogen and alkyl of less than 5 carbon atoms; R⁴ is selected from the group consisting of hydrogen and alkyl of less than 5 carbon atoms; and X is selected from the group consisting of hydrogen, bromine and chlorine with the proviso that R⁴ is an alkyl of 1 to 4 carbon atoms when X is hydrogen.

2. A compound according to claim 1 having the structural formula

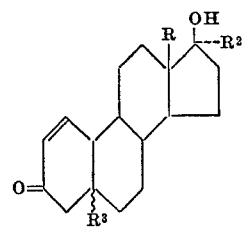

wherein R, R² and R³ are as hereinbefore defined.

3. A compound according to claim 2 that is 13,17-diethyl-17β-hydroxy-5-methylgon-1-en-3-one.

4. A compound according to claim 1 that is 13,17-dialkyl-17β-hydroxy-5-methylgon-1-en-3-one, 17-acetate.

5. A compound according to claim 1 having the structural formula

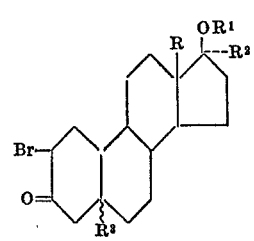

wherein R, R¹, R² and R³ are as hereinbefore defined.

6. A compound according to claim 5 that is 13,17-diethyl-2-bromo-17β-hydroxy-5-methylgonan-3-one.

7. A compound according to claim 1 having the structural formula

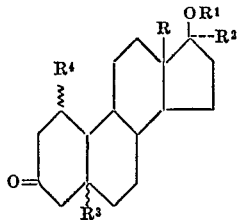

wherein R, R¹, R² and R³ are as hereinbefore defined, and R⁴ is an alkyl of 1 to 4 carbon atoms.

8. A compound according to claim 7 that is 13,17-diethyl-1,5-dimethyl-17β-hydroxygonan-3-one.

9. A compound according to claim 7 in which R⁴ is ethyl and R, R¹, R² and R³ are as hereinbefore defined.

10. A compound according to claim 7 in which R³ is ethyl and R, R¹, R² and R⁴ are as hereinbefore defined.

References Cited

UNITED STATES PATENTS 3,083,196  3/1963  Fried et al. _____ 260—239.5

OTHER REFERENCES

Mori: Chem. & Pharm. Bull., vol. 10, May 1962, pp. 382–6.

Ginsig et al.: J. Am. Chem. Soc., 87, 20, Oct. 20, 1965, pp. 4629–35.

ELBERT L. ROBERTS, Primary Examiner

U.S. Cl. X.R.

260—999